(12) United States Patent
Kannankeril

(10) Patent No.: US 7,807,253 B2
(45) Date of Patent: Oct. 5, 2010

(54) FORMED INFLATABLE CELLULAR CUSHIONING ARTICLE AND METHOD OF MAKING SAME

(75) Inventor: Charles Kannankeril, North Caldwell, NJ (US)

(73) Assignee: Sealed Air Corporation (US), Riverfront, NJ (US)

( * ) Notice: Subject to any disclaimer, the term of this patent is extended or adjusted under 35 U.S.C. 154(b) by 1309 days.

(21) Appl. No.: 11/084,916

(22) Filed: Mar. 21, 2005

(65) Prior Publication Data

US 2006/0210773 A1    Sep. 21, 2006

(51) Int. Cl.
| | |
|---|---|
| B32B 1/00 | (2006.01) |
| B32B 3/20 | (2006.01) |
| B65D 81/02 | (2006.01) |
| B65D 85/00 | (2006.01) |

(52) U.S. Cl. ................. 428/178; 428/174; 428/188; 493/967; 206/522; 206/814

(58) Field of Classification Search ................. 428/166, 428/178, 174, 188; 206/814, 522; 493/967
See application file for complete search history.

(56) References Cited

U.S. PATENT DOCUMENTS

| | | | |
|---|---|---|---|
| 2,776,451 A | 1/1957 | Chavannes | |
| 3,142,599 A | 7/1964 | Chavannes | |
| 3,285,793 A | 11/1966 | Chavannes | |
| 3,294,387 A | 12/1966 | Chavannes | |
| 3,346,438 A | 10/1967 | Chavannes | |
| 3,660,189 A | 5/1972 | Troy | |
| 3,703,430 A | 11/1972 | Rich | |
| 3,868,285 A | 2/1975 | Troy | |
| 3,873,643 A | 3/1975 | Wu et al. | |
| 3,954,368 A | 5/1976 | Kawakami | |
| 4,076,872 A | 2/1978 | Lewicki et al. | |

(Continued)

FOREIGN PATENT DOCUMENTS

EP    415730 A2    3/1991

(Continued)

OTHER PUBLICATIONS

"Determination of Branching Distributions in Polyethylene and Ethylene Copolymers", Wild et al, Journal of Polymer Science, vol. 0, 1982, pp. 441-455.

(Continued)

*Primary Examiner*—David R Sample
*Assistant Examiner*—Catherine Simone
(74) *Attorney, Agent, or Firm*—Rupert B. Hurley, Jr.

(57) ABSTRACT

An inflatable article has a first film bonded to a second film so as to provide between the first film and the second film a plurality of inflatable chambers, each of the inflatable chambers containing a plurality of cells. Each of the cells is connected to at least one adjacent cell by an inflatable connecting channel. The first film is bonded to the second film between adjacent inflatable chambers. The first film and the second film each have at least one formed region corresponding with a location of a cell, with the at least one formed region of the second film being nested into the at least one formed region of the first film. Also disclosed are processes of making the inflatable article.

21 Claims, 8 Drawing Sheets

U.S. PATENT DOCUMENTS

| | | | |
|---|---|---|---|
| 4,087,587 A | 5/1978 | Shida et al. |
| 4,096,306 A | 6/1978 | Larson |
| 4,169,002 A | 9/1979 | Larson |
| 4,231,832 A | 11/1980 | Weikert |
| 4,314,865 A | 2/1982 | Ottaviano |
| 4,394,485 A | 7/1983 | Adur |
| 4,551,379 A | 11/1985 | Kerr |
| 4,576,669 A | 3/1986 | Caputo |
| 4,657,625 A | 4/1987 | Kawakami |
| 5,116,444 A | 5/1992 | Fox |
| 5,188,691 A | 2/1993 | Caputo |
| 5,196,254 A | 3/1993 | Akiyama |
| 5,206,075 A | 4/1993 | Hodgson |
| 5,241,031 A | 8/1993 | Mehta |
| 5,272,236 A | 12/1993 | Lai et al. |
| 5,278,272 A | 1/1994 | Lai et al. |
| 5,427,830 A | 6/1995 | Pharo |
| 5,503,790 A | 4/1996 | Clements |
| 5,665,456 A | 9/1997 | Kannankeril et al. |
| 5,824,392 A | 10/1998 | Gotoh et al. |
| 5,837,335 A | 11/1998 | Babrowicz |
| 5,912,070 A | 6/1999 | Miharu et al. |
| 6,410,119 B1 | 6/2002 | DeLuca et al. |
| 6,423,166 B1 | 7/2002 | Simhaee |
| 6,682,622 B2 | 1/2004 | Matarasso |
| 6,696,135 B2 * | 2/2004 | Simhaee | 428/166 |
| 6,800,162 B2 | 10/2004 | Kannankeril et al. |
| 6,926,947 B1 * | 8/2005 | Seckel | 428/174 |
| 2002/0166788 A1 | 11/2002 | Sperry et al. |
| 2003/0037858 A1 | 2/2003 | Kannankeril et al. |
| 2003/0161999 A1 | 8/2003 | Kannankeril et al. |
| 2004/0099986 A1 | 5/2004 | Kannankeril et al. |
| 2004/0101658 A1 | 5/2004 | Kannankeril et al. |
| 2004/0101659 A1 | 5/2004 | Kannankeril et al. |
| 2006/0108052 A1 | 5/2006 | Kannankeril et al. |
| 2006/0165965 A1 * | 7/2006 | Massey | 428/212 |

FOREIGN PATENT DOCUMENTS

| | | |
|---|---|---|
| EP | 483665 | 10/1991 |
| EP | 0 701 954 B1 | 3/1996 |
| EP | 1338413 A1 | 8/2003 |
| GB | 978654 | 12/1964 |
| GB | 1087901 | 10/1967 |
| JP | 10-151627 | 6/1998 |
| WO | 90/03414 | 5/1990 |
| WO | 93/03093 | 2/1993 |
| WO | 02/26644 | 4/2002 |

OTHER PUBLICATIONS

U.S. Appl. No. 10/522,473, filed in USPTO on Aug. 22, 2002.
U.S. Appl. No. 10/082,635, filed in USPTO on Feb. 25, 2002.
U.S. Appl. No. 10/648,113, filed in USPTO on Aug. 26, 2003.
U.S. Appl. No. 10/858,803, filed in USPTO on Jun. 2, 2004.
U.S. Appl. No. 10/980,585, filed in USPTO on Nov. 3, 2004.
U.S. Appl. No. 10/980,754, filed in USPTO on Nov. 3, 2004.

* cited by examiner

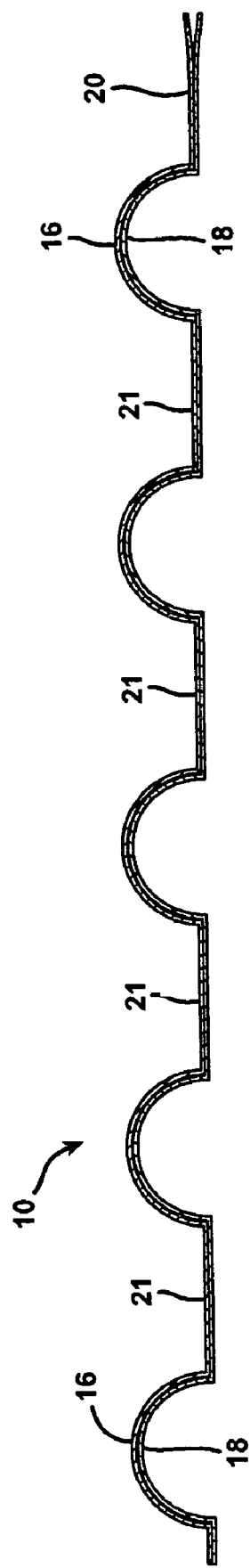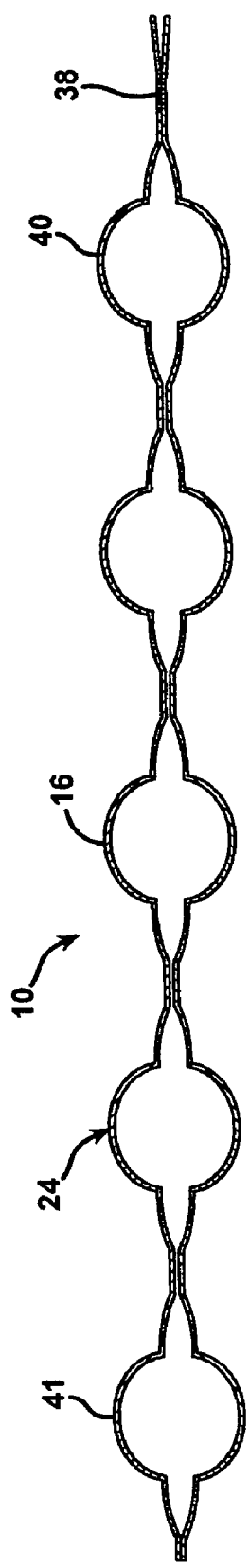

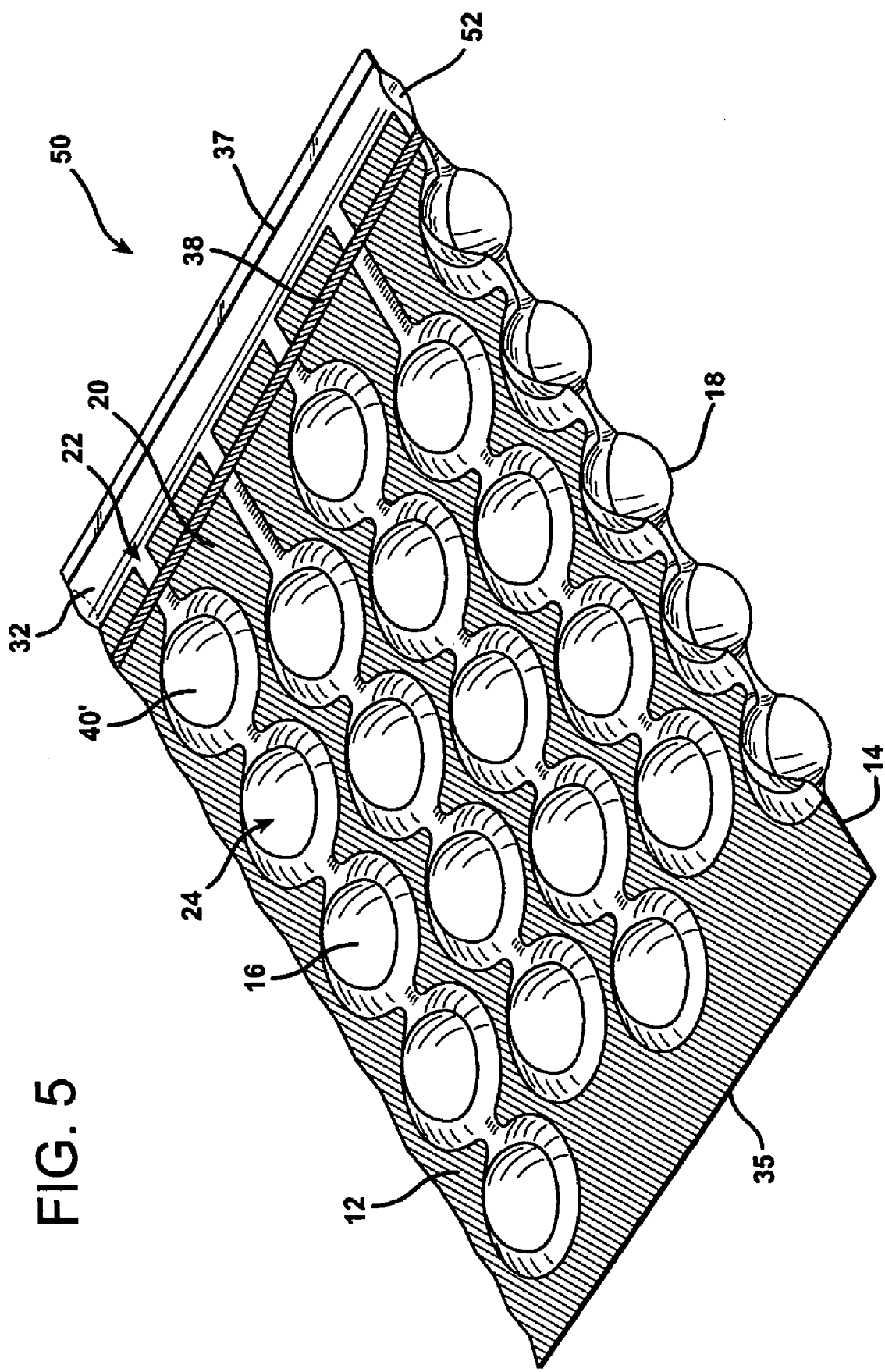

FORMED INFLATABLE CELLULAR CUSHIONING ARTICLE AND METHOD OF MAKING SAME

FIELD OF THE INVENTION

The invention pertains to cellular cushioning articles, especially air cellular cushioning articles suitable for packaging end use.

BACKGROUND OF THE INVENTION

Air cellular cushioning articles suitable for packaging applications have been in commercial use for several decades. One of the products in widespread commercial use is Bubble-Wrap® cellular cushioning, one embodiment of which is made using heat and vacuum to form spaced-apart air-filled cavities in a first film and thereafter heat sealing a flat "backing" second film to the flats between the cavities of the first film, so that air is entrapped in each of the formed cavities making up the individualized cells. The resulting air-cellular cushioning product comprises discrete closed bubbles. If any one bubble deflates, no other bubble necessarily deflates. One significant disadvantage of BubbleWrap® cellular cushioning is that shipping costs are high per unit weight of product because the product density is low, i.e., the shipping of such products is mostly shipping air.

Although Bubble Wrap® cellular cushioning products have not been significantly displaced by inflatable flexible cushioning articles, in the past there have been a number of commercialized air-cellular cushioning products for packaging which have been designed to be inflated by the end user, i.e., inflated and sealed shut immediately before end use by the packager. These products offer the advantage of being shippable before inflation, providing for much more efficient transport and storage before use, as any given volume within a truck or warehouse can hold over thirty times as much product (on a weight basis) if it is uninflated rather than shipped to the packager while inflated.

Flat films which are sealed together to make an inflatable cellular cushioning product exhibit a disadvantage of widthwise contraction upon inflation. One way to reduce widthwise contraction upon inflation is to thermoform one of the films as disclosed in U.S. Pat. No. 6,423,166, to Simhaee. However, this product exhibits the disadvantage of having to remove entrapped air from the volume between the bubble sheet and the base layer, in order to achieve a higher density product which provides the advantage of more efficient transport and storage.

It would be advantageous to provide a cellular cushioning article having the density advantage of an uninflated, inflatable product without having to remove air from within the cells. The removal of air is a process step which is time-consuming and difficult to carry out, especially to the degree of substantially complete removal, or complete removal, of the air from between the two films.

SUMMARY OF THE INVENTION

The present invention pertains to an inflatable flexible cellular cushioning article made from two films sealed together in a pattern providing a plurality of inflatable chambers. At least some of the chambers (preferably all of the chambers) include a plurality of inflatable cells connected to one another by connecting channels. Both of the films have formed regions which allow the article to undergo inflation with reduced lateral contraction relative to the inflation of unformed films which have been sealed together to make an inflatable cellular cushioning article. Because the formed regions of the second film are nested into the formed regions of the first film, both films are formed and there is no need to remove air from between the films in order to reduce the volume occupied by the formed inflatable article. Upon inflation of the article, the formed regions of the second film invert and separate from the formed regions of the first film. Relative to an unformed inflatable article, the formed regions impart increased cell height and increased cell volume, relative to an inflatable article made from unformed films.

As a first aspect, the present invention is directed to an inflatable cellular cushioning article comprising a first film bonded to a second film so as to provide between the first film and the second film a plurality of inflatable chambers. Each of the inflatable chambers comprises a plurality of cells. Each of the cells of the same chamber (i.e., of any given chamber) is connected to at least one adjacent cell by an inflatable connecting channel. The first film is bonded to the second film between adjacent inflatable chambers. The first film and the second film each have at least one formed region corresponding with a location of a cell, with the at least one formed region of the second film being nested into the at least one formed region of the first film. Optionally, the regions of the films which are to serve as the connecting channels can also be formed.

Preferably, the first film and the second film each have a plurality of formed regions, each of the formed regions corresponding with the location of a cell, with each of the formed regions of the second film being nested into each of the formed regions of the first film.

Preferably, each of the formed regions of the first and second films is surrounded by an unformed, unbonded region of the film for enveloping a single inflatable cell. This unbonded region is preferably narrow, i.e., is from 0.2 mm to 6 mm, more preferably from 1 mm to 3 mm.

Preferably, the inflatable chambers extend transversely across the inflatable article. That is, the inflatable chambers extend in a direction which is either perpendicular to the machine direction of the inflatable article, or is within 45 degrees of a line which is transverse to the machine direction of the inflatable article.

The first film can be bonded to the second film with an adhesive, a cohesive, or a heat seal. If an adhesive is used instead of heat sealing, an ultraviolet-curable adhesive is a preferred adhesive for bonding the first film to the second film.

In one preferred embodiment, the film(s) each have a unit weight of from 20 to 70 grams per square meter, and each of the formed regions in the film(s) each have a maximum dimension of from 0.25 to 3 inches. In another preferred embodiment, the film(s) each have a unit weight of from 60 to 250 grams per square meter, and each of the formed regions in the first film and the second film have a maximum dimension of from 0.5 to 6 inches.

Preferably, each of the formed regions of the film(s) have a height of from about 1 millimeter to about 50 millimeters. As used herein, the phrase "height of the formed region" refers to the maximum deviation of any one formed region from the plane of the unformed portion of the film, i.e., the plane containing the land area of the film. Of course, different formed regions can have different heights. More preferably, the formed regions of the film have a height of from 2 to 25 millimeters, more preferably from 5 to 15 millimeters.

Preferably, each of the film(s) have a thickness of from about 0.5 to about 6 mils; more preferably, from 1 to 3 mils.

In one embodiment of the present invention, the inflatable article has an open inflation skirt along a first edge running the length of the inflatable article.

In another embodiment, the inflatable article has a closed inflation manifold running the length of the inflatable article. In a first species of this alternative embodiment, the closed inflation manifold extends along a first side edge extending the length of the inflatable article, with the plurality of inflatable chambers extending from the inflation manifold across the inflatable article and towards the other side edge extending the length of the inflatable article. In a second species of this alternative embodiment, a plurality of inflatable chambers extends from a first side of the inflation manifold and a plurality of inflatable chambers extends from a second side of the inflation manifold, with the inflatable chambers which extend from the first side of the inflation manifold extending across the inflatable article towards the first side edge of the inflatable article, and the inflatable chambers which extend from the second side of the inflation manifold extending across the inflatable article towards the second side edge of the inflatable article. In this second species, the closed inflation manifold is not located along one side edge of the article, but instead extends down an interior portion of the article. In one embodiment, the inflation manifold is centered on a longitudinal (i.e., machine direction) centerline of the article.

Preferably, each of the inflatable chambers contains from 1 to 100 cells, more preferably 2 to 50 cells, 3 to 20 cells, or 4 to 10 cells.

In one embodiment, the first and second films are connected to one another along one fold line. In another embodiment the first and second films are connected to one another along two fold lines. In another embodiment, the first film and second film are separate films. In another embodiment, the bond is a heat seal.

The first film and/or the second film can be a monolayer film or a multilayer film. Preferably the first film and/or the second film comprises at least one member selected from the group consisting of polyethylene, ethylene/alpha-olefin copolymer, ethylene/unsaturated ester copolymer, ethylene/unsaturated acid copolymer, polypropylene, propylene/ethylene copolymer, polyethylene terephthalate, polyamide, polyvinylidene chloride, polyacrylonitrile, ethylene/vinyl alcohol (i.e., EVOH, which is actually the saponified ester of ethylene/vinyl acetate copolymer), and propylene/vinyl alcohol (i.e., PVOH). Preferably, the first film is a multilayer film and the second film is a multilayer film.

Preferably, the first film comprises a seal layer and an $O_2$-barrier layer, and the second film comprises a seal layer and an $O_2$-barrier layer. While the first film and/or the second film may further comprise a tie layer between the seal layer and the $O_2$-barrier layer, the polymer which serves to tie the seal layer to the $O_2$-barrier layer may alternatively be blended into either the $O_2$-barrier layer or the seal layer, in order to avoid providing the film with a separate seal layer. However, it is preferred that the first film and the second film each comprise the seal layer, the $O_2$-barrier layer, and a tie layer between the seal layer and the $O_2$-barrier layer, with the seal layer of the first film being bonded to the seal layer of the second film in the inflatable article. The seal layer of the first and second films comprises at least one member selected from the group consisting homogeneous ethylene/alpha-olefin copolymer, very low density polyethylene, low density polyethylene, linear low density polyethylene, ethylene/unsaturated acid copolymer (particularly ethylene/vinyl acteate copolymer), ethylene/unsaturated ester copolymer, and ionomer resin.

Preferably, the first film comprises first and second outer layers, a central gas barrier layer, a first tie layer between the first outer layer and the gas barrier layer, and a second tie layer between the gas barrier layer and the second outer layer. Preferably, the second film comprises first and second outer layers, a central gas barrier layer, a first tie layer between the first outer layer and the gas barrier layer, and a second tie layer between the gas barrier layer and the second outer layer. Preferably, the first outer layer of the first film is sealed to the first outer layer of the second film. Preferably, the first and second outer layers of the first film have the same layer thickness and have the same polymeric composition, and the first and second tie layers of the first film have the same layer thickness and the same polymeric composition, and the first and second outer layers of the second film have the same layer thickness and have the same polymeric composition, and the first and second tie layers of the second film have the same layer thickness and the same polymeric composition. Preferably, the gas barrier layer of the first and/or second films comprises at least one member selected from the group consisting of polyamide, hydrolyzed ethylene/vinyl acetate copolymer, polyvinylidene chloride, polyacrylonitrile, and polyester, and the gas barrier layer of the second film comprises at least one member selected from the group consisting of polyamide, hydrolyzed ethylene/vinyl acetate copolymer, polyvinylidene chloride, polyacrylonitrile, and polyester.

As a second aspect, the present invention is directed to a process for making an inflatable article, comprising: (A) bonding a portion of a first film to a corresponding portion of a second film so that a resulting sealed article comprises a plurality of inflatable chambers comprising a plurality of inflatable cells, each of the cells in the chambers being connected to an adjacent cell by an inflatable connecting channel, the first film being bonded to the second film between adjacent inflatable chambers; and (B) forming at least one region of the first film and at least one region of the second film, the formed regions corresponding with a location of a particular cell, with the formed region of the second film being nested into the formed region of the first film. Optionally, the process can further comprise extruding the first and second films and thereafter cooling the first and second films before bonding the first film to the second film.

Preferably, the process is an integrated process, in that the extrusion, bonding, and forming are carried out in an uninterrupted, continuous process. In a non-integrated process, an intermediate product is produced and placed aside awaiting further processing in one or more further processing steps. If an intermediate product is maintained in the production line, but is held in a moving inventory environment on a racking system, with the process being completed without separation of the film strand being extruded, the process is considered to be an integrated process.

Optionally, after the inflatable article is made, it can be pressed into a flatter configuration by a pressing means. That is, the formed regions of the article can be pressed into a configuration in closer alignment with the plane of the unformed areas of the article, so that upon winding the inflatable article into a roll, a wound roll of greater density can be produced. Means for pressing the article into the flatter configuration include nip rollers, oscillating flat plate press, etc.

In one embodiment, the first film and second film are extruded as separate films, either through separate slot dies or through separate annular dies. If through separate annular dies, the resulting film tubings can either be self welded in lay-flat configuration to form two flat films, or each can be slit lengthwise and bonded to one another while each is in its lay-flat configuration.

In another embodiment, the extrusion is carried out through a slot die, with the resulting film being folded to form the first and second films which are connected to one another along one fold line.

In another embodiment, the extrusion is carried out through an annular die to form a tubular film which is collapsed into lay-flat configuration and slit lengthwise to form the first and second films which are connected to one another along one fold line.

In another embodiment, the extrusion is carried out through an annular die to form a tubular film which is collapsed into lay-flat configuration, to form first and second films which are connected to one another along two fold lines.

In one preferred embodiment, the bonding of the first film to the second film is carried out by passing the second film between a heat sealing roller and the first film, with both the first film and the second film making a partial wrap together around the sealing roller, with the second film making a longer partial wrap around the sealing roller than the first film, with the first film contacting the second film after the second film has made a portion of its partial wrap around the sealing roller. Preferably, the process further comprises contacting the first film with a nip roller while the first and second films are making the partial wrap together around the heat sealing roller, the nip roller pressing the first and second films together to assist in heat sealing the first film to the second film.

In one embodiment, the forming of the first and second films is carried out by passing the first and second films together between: (i) an embossing roller having a plurality of cavities on the surface thereof; and (ii) a forming roller having a plurality of protuberances on the surface thereof. The forming roller has a surface temperature low enough to prevent the first and second films from fusing to one another in the area being formed. The protuberances on the forming roller are aligned to enter the cavities of the embossing roller between the embossing roller and the forming roller, with the protuberances being undersized relative to the cavities of the embossing rollers so that portions of the first film which the protuberances force into the cavities in the embossing roller are not fused to the second film. Preferably, the forming roller and the embossing roller are in nip relationship with one another.

In one preferred embodiment, the embossing roller has an outer surface which has a temperature above ambient temperature. The temperature of the embossing roller can even be high enough to cause the first and second films to bond to one another throughout the land areas, i.e., the areas in which the first film or second film contacts the embossing roller. However, the process should not cause the first and second films to bond to one another in the area in which the first and/or second films are being formed. Thus, the temperature of the forming roller should be low enough that the first and second films do not bond to one another in the regions in which the first and/or second films contact the forming roller. In another preferred embodiment, the embossing roller has an outer surface at ambient temperature (i.e., room temperature), or below ambient temperature, with the forming being done "cold", i.e., without heating either of the films to a temperature at which bonding to one another occurs.

In one embodiment, the bonding step is carried out before the forming step. In an alternative embodiment, the forming step is carried out before the bonding step. In yet another embodiment, the bonding step and the forming step are carried out simultaneously using a rotatable, heated sealing roller having an outer surface, the outer surface of the sealing roller comprising a first surface portion defining a configuration corresponding to a desired heat seal pattern and formed of a first material having a first thermal conductivity and a second surface portion formed of a second material having a second thermal conductivity lower, and preferably substantially lower, than the first thermal conductivity such that only areas of the film in contact with the first surface portion are heat sealed together while areas of the film contacted by the second surface portion remain unsealed to each other. Such a sealing roller is described in U.S. Ser. No. (10/980,754), filed Nov. 3, 2004, in the name of Robert O'Dowd, entitled "PROCESS AND APPARATUS FOR MAKING HEAT-SEALED ARTICLES", the entirety of which is hereby incorporated by reference thereto.

In one embodiment, both the first and second films are formed in a plurality of regions, each of the regions corresponding with at least two adjacent cells of the same chamber, and at least one connecting channel connecting the two adjacent cells. Preferably, the formed region is continuous throughout the inflatable chamber, and the unformed region is continuous throughout the unformed region (i.e., land area). With this arrangement of formed and unformed regions, a smooth heat sealing roller can thereafter be used to heat seal the two films together in the unformed regions between the inflatable chambers.

BRIEF DESCRIPTION OF THE DRAWINGS

FIG. 2 is a cross-sectional view taken through section 2-2 of FIG. 1, except that the cross-sectional view is of the inflatable article unexploded.

FIG. 4 is a cross-sectional view taken through section 4-4 of FIG. 3, except that this cross-sectional view is of the inflatable article unexploded.

FIG. 5 is a perspective cut-away view of a first alternative inflatable article in accordance with the present invention, after inflation.

DETAILED DESCRIPTION OF THE INVENTION

Figure 1:
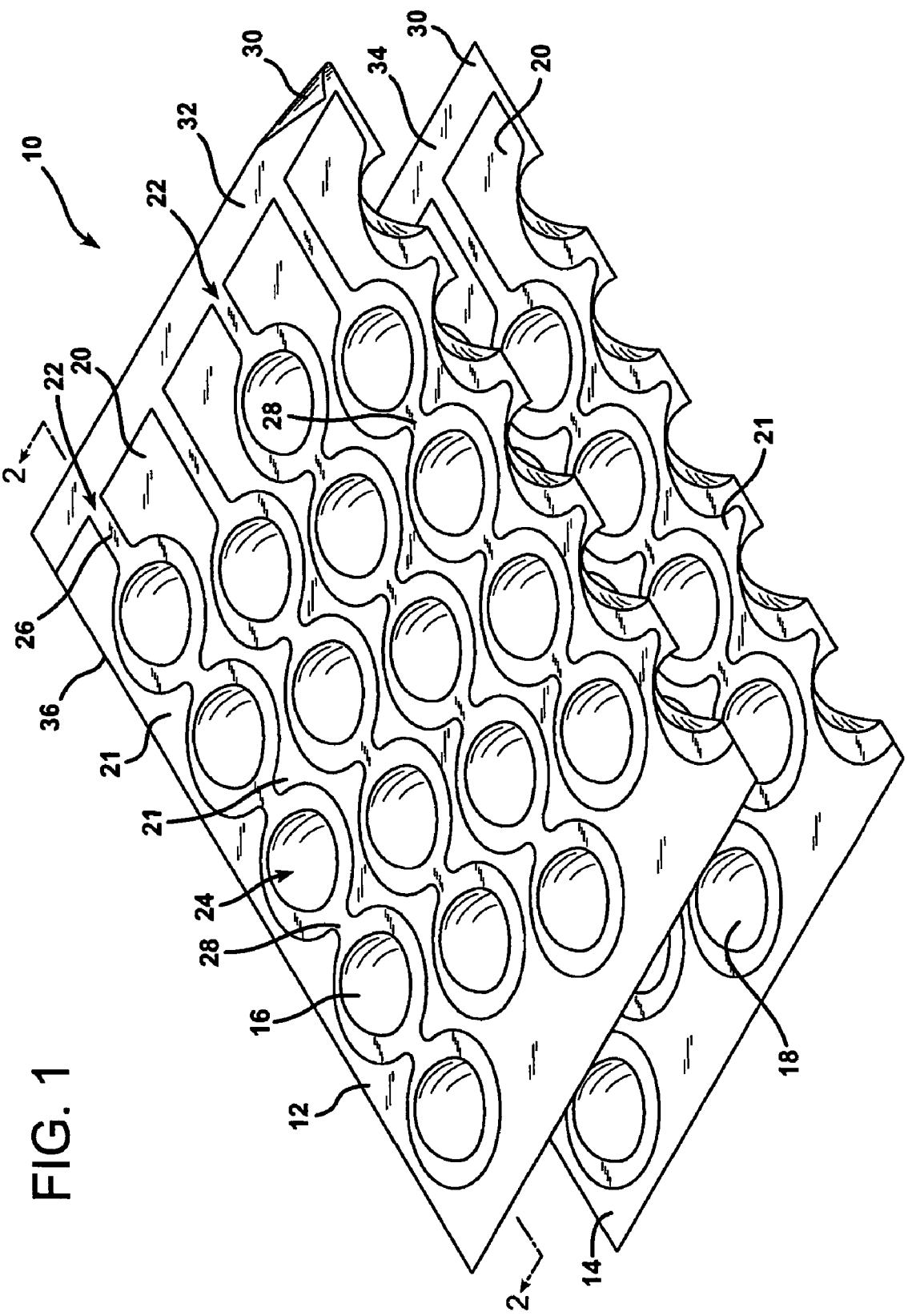
FIG. 1 is an exploded perspective cut-away view of an inflatable article in accordance with the present invention, before inflation.

As used herein, the term "film" is used in a generic sense to include plastic web, regardless of whether it is film or sheet. Preferably, films of and used in the present invention have a thickness of 0.25 mm or less.

As used herein, the phrases "first film" and "second film" include not just a first film which is discrete from (i.e., separated from) a second film, but also a first film which is a first leaf of a folded film (e.g., a centerfolded film) with the second film being the second leaf of the folded film. Still further, the first film could be a first lay-flat side of a lay-flat film tubing, and the second film could be a second lay-flat side of the same film tubing, with both lay-flat sides being joined to each other along two fold lines.

As used herein, the phrase "flat film" is used with respect to a film which is in the form of a sheet, i.e., has side edges which form the film boundaries along its length. A flat film is to be contrasted with an annular film, which in lay flat position has no side "edges", but rather has side folds (which optionally may be creased) along the length of the film tubing.

As used herein, the phrase "inflatable chamber" refers to a contiguous volume between two films bonded together to form an uninflated, inflatable article. The inflatable article of the present invention has a plurality of inflatable chambers. While the two films are preferably bonded to one another throughout the area between adjacent chambers, it is only necessary to bond the two films together along the perimeter of the inflatable chamber, so that upon sealing off the inflation channel after the chamber has been inflated, the inflation gas is retained within the chamber. The volume within the chamber is increased by introduction of inflation gas, which causes the two films to separate from one another to form an inflated chamber. Each inflated chamber preferably comprises a plurality of inflatable cells and a plurality of channels, including an inflation channel and at least one connecting channel. The phrase "inflatable cell", as used herein, refers to an enlarged region of an inflatable chamber. The phrase "inflation channel" refers to an inflatable passageway in a region of the inflatable article through which the inflation fluid can be pumped to fill an inflatable chamber. The phrase "connecting channel" refers to an inflatable passageway in a region of an inflatable chamber through which the inflation fluid can be pumped from one cell to another.

Because the inflatable article has inflatable chambers designed for use as cellular cushioning, each chamber is to be inflated with a gas. Air is the preferred gas for inflation. Other suitable gases include nitrogen, carbon dioxide, argon, and helium, as well as mixtures of these gases.

As used herein, the phrase "formed region" refers to a region of a film which extends out of the plane of the film. For example, each of the "bubbles" in the thermoformed film portion of Bubble Wrap® cellular cushioning is a formed region. Forming is a process in which the shape of the film is changed to a desired configuration, usually with the aid of heat and pressure to produce a non-elastic deformation of the film, thereby increasing the surface area of the film and the shape of the film. However, as used herein, the "forming" of a film, and the resulting "formed regions" in the film, include molding and casting processes, and the resulting articles, respectively. Preferably, the formed article of the present invention is made by thermoforming or cold forming of two flexible film sheets which have been bonded to one another before forming, or which are bonded to one another after the forming process is carried out.

The phrase "maximum dimension", as used with respect to formed regions of films, refers to the largest measured dimension of the formed region taken in any of the following: (a) the main plane of the film, and (b) in any plane parallel to the main plane of the film, and (c) any plane perpendicular to the main plane of the film.

As used herein, the term "nested" refers to the relationship in which at least a portion of the formed region of a second film resides within at least a portion of a cavity of the formed region of a first film. Nesting is present if any portion of the formed region of the second film breaks the plane across the base of the formed region of the first film. Nesting is maximized if the second film contacts the first film throughout the cavity of the first film.

As used herein, the phrase "a formed region corresponding with a location of a cell" is inclusive of (a) formed regions limited to a single cell, e.g., a formed film portion which is surrounded by an unformed, unbonded film portion of a single cell, as well as (b) formed regions which extend to or even through one or more boundaries between one or more unbonded portions of the film and one or more bonded portions of the films. Thus, any given formed region can include part or all of that portion of the films which envelops one or more cells of one or more inflatable chambers. Preferably, however, the inflatable article includes a plurality of formed regions, with each formed region being confined to an unbonded portion corresponding with a single cell.

As used herein, the term "seal" refers to any seal of a first region of a film surface to a second region of a film surface. The first and second regions can be on the same or different films. The seal is preferably formed by the use of heat and pressure. In making the seal, at least one region (preferably both regions) is heated to its seal initiation temperature. The sealing can be performed by any one or more of a wide variety of manners. Peferably sealing is carried out by contacting the films with a heated drum to produce a heat seal, as described below. The term "seal" is also inclusive of a film adhered to itself with an adhesive or cohesive, or films adhered to one another with an adhesive or cohesive. However, the various layers of a multilayer coextruded film are not considered to be "sealed" to one another because the term "seal", as used herein, refers to adhering less than the entire film surfaces to one another. Thus, a seal leaves an unsealed region of the film.

In contrast, the bond holding coextruded entire film layers to one another is herein termed a "lamination". The term "lamination" is inclusive of not only layers coming together as molten streams, but also layers which are bonded to one another with an adhesive or cohesive.

The term "bond" is generic with respect to all manners of causing two films to cleave to one another, i.e., to adhere firmly to one another. Bonding is inclusive of being adhered to one another with adhesive, corona treatment, heat sealing, etc. Preferably, the two films are bonded by being heat sealed to one another.

Figure 1A:
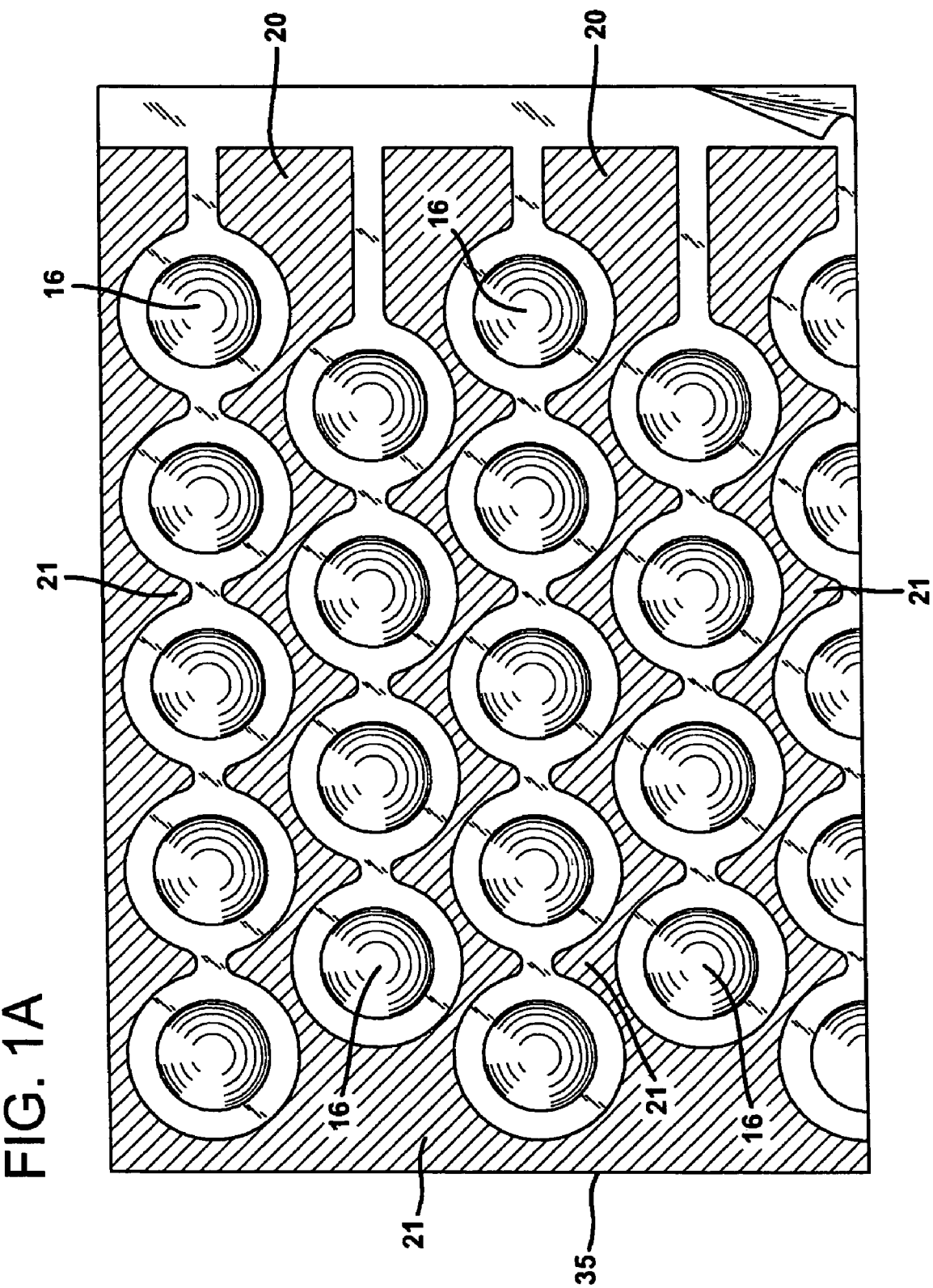
FIG. 1A illustrates a top view of the inflatable article of FIG. 1, except that the inflatable article is not exploded in the top view of FIG. 1A.

Referring to FIG. 1, FIG. 1A, and FIG. 2 together, there is shown an inflatable article 10 that has not yet been inflated. Inflatable article 10 has formed regions 16 in first film 12 and formed regions 18 in second film 14. Films 12 and 14 are not bonded to one another in formed regions 16 and 18. Formed regions 18 in second film 14 are nested within the respective cavities of formed regions 16 of first film 12.

First film 12 and second film 14 are sealed together in bonded region 21. The edges of bonded region 21 are shaped, sized, and located to define each of the inflatable chambers of inflatable article 10 as well as the inflation fluid entrance ports 22 and inflation channels 26. The entire shaded region in FIG. 1A corresponds with the bonded region 21 between first film 12 and second film 14.

Each of the inflatable chambers of inflatable article 10 includes inflatable inflation channel 26, a plurality of inflatable cells 24, and a plurality of inflatable connecting channels 28. The regions of films 12 and 14 which make up inflation channels 26 and connecting channels 28 may be flat, i.e., unformed, as illustrated in FIGS. 1, 1A, and 2, or may be formed and nested with one another, i.e., in a manner not illustrated but corresponding with the nesting of formed regions 16 and 18. Inflation channels 26 extend from open skirt 30 formed by unbonded film side edge regions 32 and 34.

Bonded region 21 between adjacent inflatable chambers are actually one continuous sealed region, as bonded region 21 extends continuously along the length of longitudinal edge 35. See FIG. 1A. The portions of bonded region 21 which are between adjacent inflatable chambers, in combination with that portion of bonded region 21 along longitudinal edge 35, define the boundaries of each inflatable chamber. As can be seen in FIGS. 1 and 1A, bonded region 21 has a repeating pattern. Bonded region 21 is preferably made using heat and pressure to cause a bond between the inner surfaces of films 12 and 14. Alternatively, films 12 and 14 may be adhesively bonded to each other.

Figure 3:
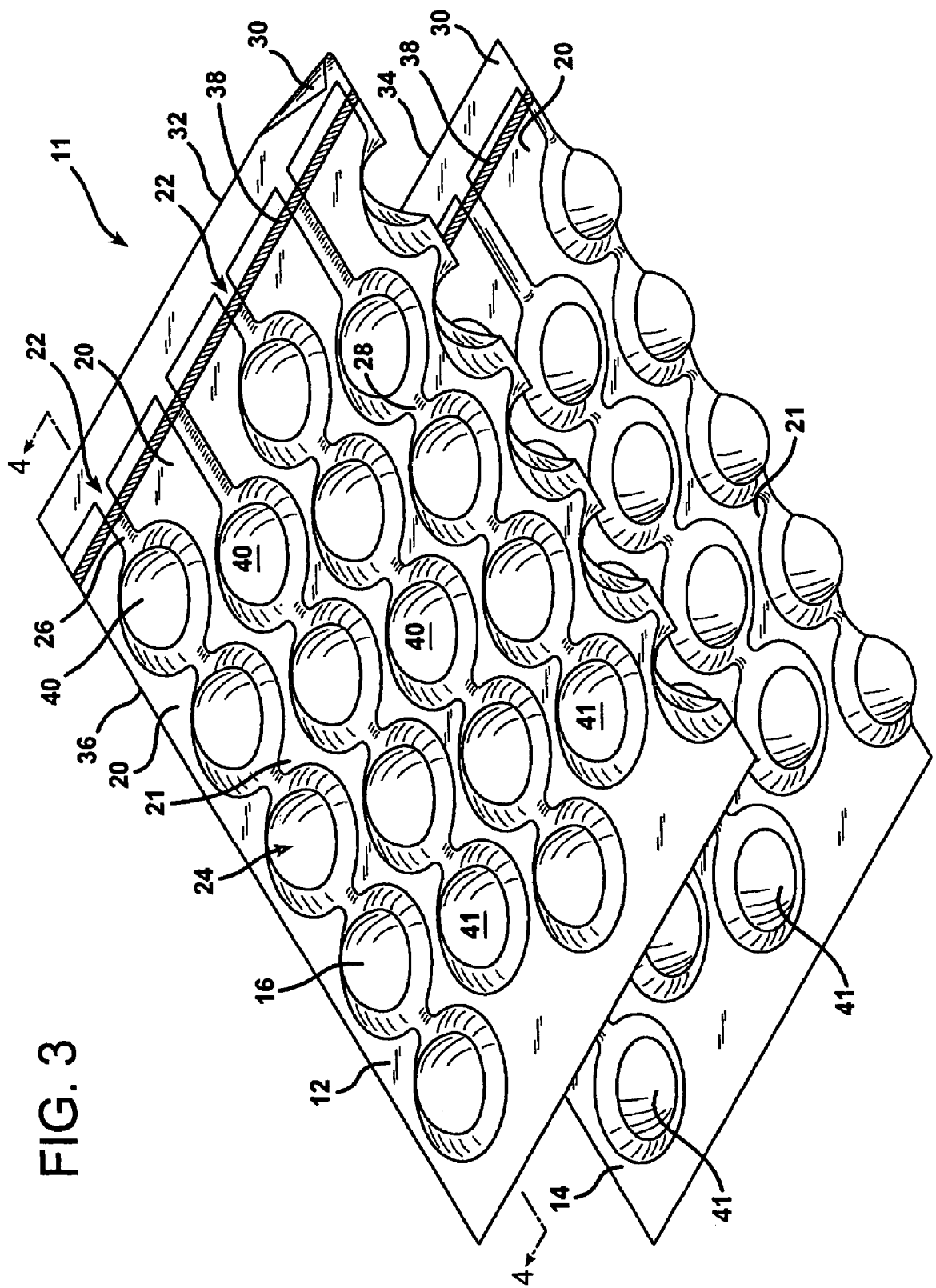
FIG. 3 is an exploded perspective cut-away view of the inflatable article of FIG. 1, after inflation.

FIG. 3 is an exploded perspective cutaway view of inflated article 11 with each inflatable chamber heat sealed closed with heat seal 38. Heat seal 38 extends along the length of inflated article 11, providing a seal across each of inflation channels 26. Unbonded side edge regions 32 and 34 serve as flanges and together form open skirt 30 used by the inflation apparatus (not illustrated) during the inflation process. Inflated cells 24, inflated connecting channels 28, and those portions of inflated inflation channels 26 which are downstream (relative to the flow of the inflation gas) of heat seal 38, together become a single inflated chamber, with the resulting inflated cells 24 being connected in series and in fluid communication with one another, by inflated connecting channels 28.

In each inflated chamber, inflated cells 24 are illustrated arranged in series, with inflated cells 24 of a chamber extending from proximate inflated cell 40, i.e., the first cell in the series, which is the cell closest to inflation channel 26, to distal inflated cell 41, which is the terminal cell in each inflated chamber. Each chamber has a predetermined length, with the length of each chamber being the same or different. As illustrated in the embodiments of FIG. 1 and FIG. 3, the length of adjacent chambers alternates in an "A-B-A-B . . ." arrangement, with each of the "A" chambers having the same length and each of the "B" chambers having the same length. Moreover, inflatable cells 24 in adjacent chambers are staggered, i.e., off-set from one another, in order that the cells in adjacent chambers are in a close-packed arrangement. The close-packing provides more cushioning volume per unit area of inflatable article 10.

During inflation of each inflatable chamber, the formed region of second film 14 inverts and separates from the formed region of first film 12. That this occurs can be seen by comparing FIG. 1 with FIG. 3, as these two figures illustrate, respectively, the same inflatable article 10 before inflation (i.e., FIG. 1) and after inflation (i.e., FIG. 3). The inflation process forms an interior volume which expands upon the ingress of inflation gas into the inflatable chambers.

The depth to which films 12 and 14 are formed may represent virtually the entire thickness of the inflated cells, or may represent only a fraction of the thickness of the resulting inflated cells if both formed films bulge out to maximize the amount of inflation fluid between films 12 and 14 from inflation of the chamber. The latter is illustrated in the cross-sectional view of FIG. 4. Preferably, first film 12 and second film 14 are each formed to a depth of from about 1 to about 50 millimeters, more preferably from about 2 to about 25 millimeters, and more preferably from about 5 to about 15 millimeters. As illustrated in the particular embodiment of FIG. 4, upon inflation the formed regions of second film 14 invert and the resulting inflated chambers bulge from the inflation fluid, resulting in a maximum thickness which is greater than twice the formed depth of first film 12 and second film 14.

The inner unbonded surfaces of side edge regions 32 and 34 can be brought into close slidable engagement with outwardly facing surfaces of an appropriately configured nozzle or other inflation means so as to provide a partially-closed inflation zone which promotes efficient and reliable sequential inflation of the inflatable chambers, without restricting the movement of the web or inflation nozzle that is required to effect this sequential inflation. Unbonded side edge regions 32 and 34, which together form the open skirt, are preferably at least ¼ inch to 3 inches in width and, more preferably, from ½ inch to 1½ inches in width. Unbonded side edge regions 32 and 34 may have different widths; alternatively, they may have the same width, as in the embodiment illustrated in FIG. 1. A preferred apparatus and method for effecting inflation and sealing of the chambers is disclosed in U.S. Ser. No. 10/057,067, Pub. No. 2002/0166788A1, published Nov. 14, 2002, to Sperry et. al., entitled "APPARATUS AND METHOD FOR FORMING INFLATED CHAMBERS", which is hereby incorporated, in its entirety, by reference thereto.

Once inflatable article 10 is inflated, inflated connecting channels 28 serve as flexible junctions, allowing the inflated article 11 to be readily bent so it can be conformed about a product, providing optimal cushioning. In another embodiment, the seal pattern can comprise relatively narrow seals that do not provide planar regions. These seals serve as the common boundary between adjacent chambers. Such a seal pattern is shown for example in U.S. Pat. No. 4,551,379, the disclosure of which is incorporated herein by reference.

FIG. 5 is a perspective cut-away view of alternative inflated article 50 in accordance with the present invention. Inflated article 50 is the same as inflated article 11 illustrated in FIG. 3, except that instead of having the unbonded edge regions 32 and 34 which form an open skirt as in the embodiment of FIG. 3, inflated article 50 has longitudinal seal 37 running the length of the edge along inflation channels 22, forming inflation manifold 52 which provides a closed channel for inflation of the inflatable chambers.

Figure 6:
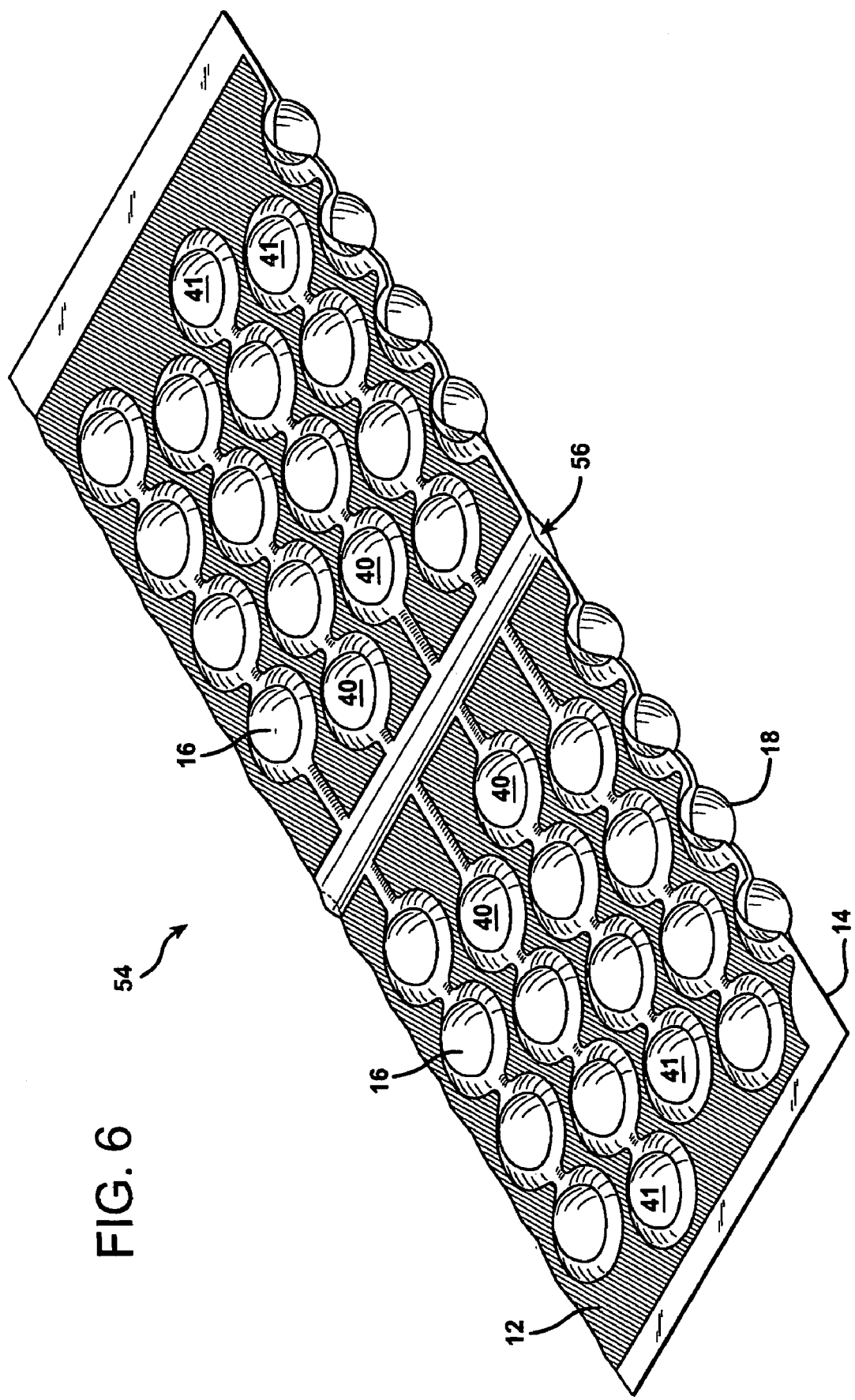
FIG. 6 is a perspective cut-away view of a second alternative inflatable article in accordance with the present invention, after inflation.

FIG. 6 is a perspective cut-away view of a second alternative inflated article 54 in accordance with the present invention. The embodiment of FIG. 6 differs from the embodiment of FIG. 5 in that it has an internally-located inflation manifold 56 having inflatable chambers extending from opposing sides of inflation manifold 56. Although article 54 is illustrated as inflated, it would be provided with a longitudinal seal (not illustrated) along each side of inflation manifold 56, to seal each of the inflated chambers closed.

Figure 7:
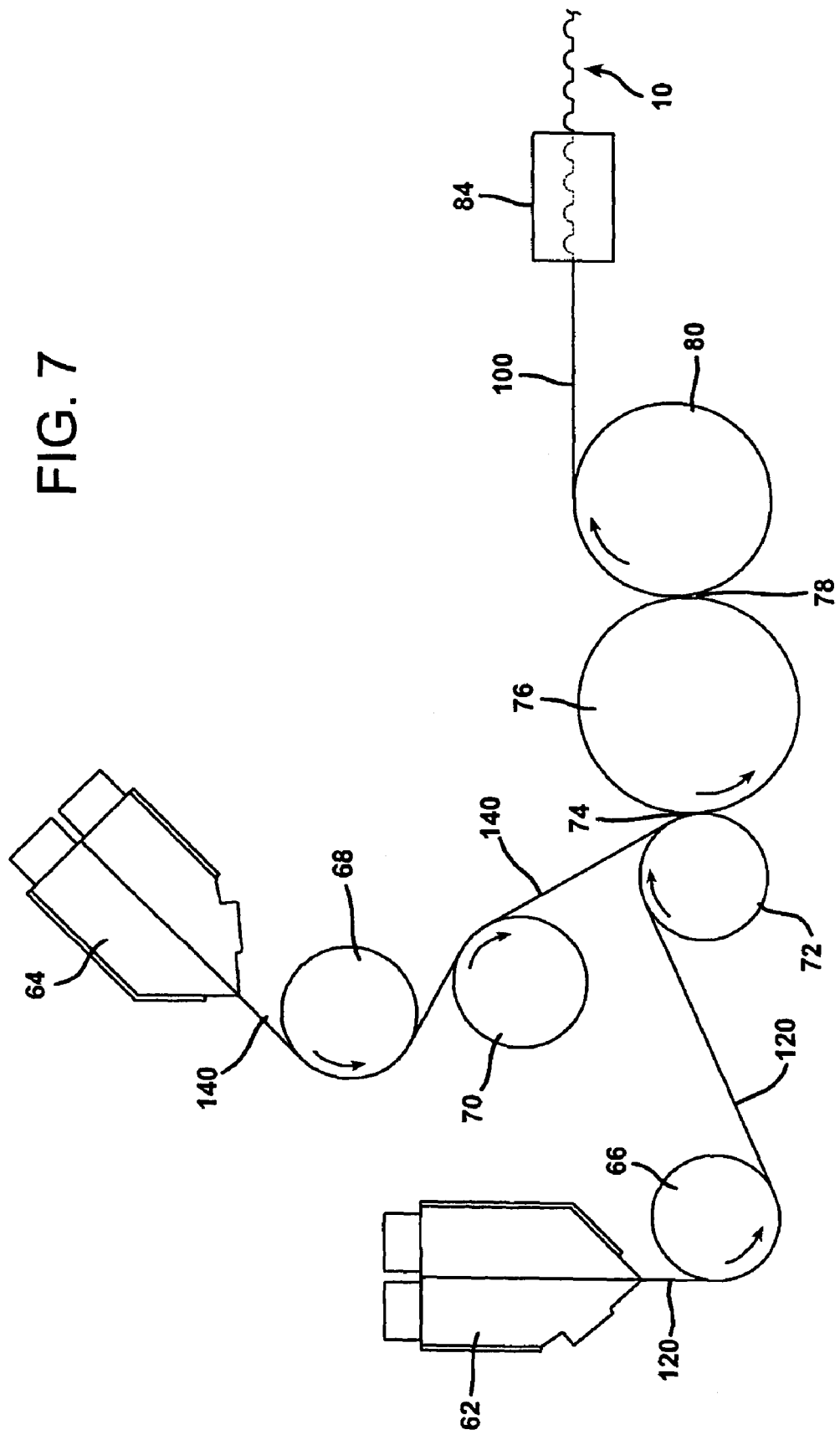
FIG. 7 is a schematic of a first process for making the inflatable article in accordance with the present invention.

FIG. 7 is a schematic of a process for making the inflatable article of the present invention. In FIG. 7, extruders 62 and 64 extrude first flat film 120 through a first slot die, and second flat film 140 through a second slot die, respectively. After extrusion, film 120 makes a partial wrap around heat transfer (cooling) roller 66, which preferably has a diameter of 8 inches and which is maintained at a surface temperature well beneath the fusion temperature of the extrudate, e.g., from 100-150° F. Second film 140 makes partial wraps around each of heat transfer (cooling) rollers 68 and 70, each of which has a diameter of 8 inches and each of which is maintained at a surface temperature similar to that of cooling roller 66. After cooling, first film 120 makes a partial wrap (about 90 degrees) around Teflon® coated rubber nip roll 72, which has a diameter of 8 inches and which has, as its primary function, maintaining nip with heat transfer (heating) raised surface roll 76. While first film 120 is making a partial wrap around nip roll 72, second film 140 merges with first film 120, with films 120 and 140 being together in partial wrap for a short distance around nip roll 72 before together entering first nip 74. Nip roller 72 provides a location for films 120 and 140 to come together without being marred or distorted.

Thereafter, second film 140 makes direct contact with raised surface roller 76 (which is illustrated as a smooth roll only for simplicity of illustration). First nip 74 subjects films 120 and 140 to a pressure of from 2 to 10 pounds per linear inch, preferably 2 to 6 pounds per linear inch, more preferably about 4 pounds per linear inch.

Films 120 and 140 together contact raised surface roller 76 for a distance of about 180 degrees. Raised surface roller 76 has a diameter of 12 inches, and is heated by circulating hot oil therethrough so that the roller surface is maintained at a temperature of from 280° F. to 350° F. The edges of the raised surface on roller 76 are rounded over to a radius of 1/64 inch. Raised surface roller 76 also has a Teflon® polytetrafluoroethylene coating thereon, with the raised surfaces being above the background by a distance of 1/4 inch (0.64 cm). Moreover, the raised surface is provided with a surface roughness of from 50 to 500 root mean square (i.e., "rms"), preferably 100 to 300 rms, more preferably about 250 rms. This degree of roughness improves the release qualities of raised surface roller 76, enabling faster process speeds and a high quality product which is undamaged by licking back on raised surface roller 76.

The raised surface heats that portion of film 140 which contacts the raised surface of roller 76. Heat is transferred from raised surface roller 76, through a heated portion of film 140, to heat a corresponding portion of film 120 to be bonded to film 140 to produce, for example, bonded region 21 of inflatable article 10 illustrated in FIG. 1. Upon passing about 180 degrees around raised surface roller 76, heated films 120 and 140 together pass through second nip 78, which subjects heated films 120 and 140 to about the same pressure as is exerted in first nip 74, resulting in a bonded region between films 120 and 140. The bonded region has a repeating pattern.

After passing through second nip 78, films 120 and 140, now bonded together, pass about 90 degrees around heat transfer (cooling) roller 80, which has a diameter of 12 inches and which has cooling water passing therethrough, the cooling water having a temperature of from 100° F. to 150° F. Cooling roller 80 has a 1/4 inch thick (about 0.64 cm thick) release and heat-transfer coating thereon. The coating is made from a composition designated "SA-B4", which is provided and applied to a metal roller by Silicone Products and Technologies Inc of Lancaster, N.Y. The coating contains silicone rubber to provide cooling roller 74 with a Shore A hardness of from 40 to 100, preferably 50-80, more preferably 50-70, and still more preferably about 60. The SA-B4 composition also contains one or more fillers to increase the heat conductivity to improve the ability of cooling roller 80 to cool the bonded region of the films. Various additional details of the apparatus and process of FIG. 7 are set forth in U.S. Pat. No. 6,800,162 B2 to Kannankeril et al., entitled INTEGRATED PROCESS FOR MAKING INFLATABLE ARTICLE, issued Oct. 5, 2004, which is hereby incorporated, in its entirety, by reference thereto. Inflatable article 100 thereafter passes through a forming apparatus 84 (illustrated schematically in FIG. 7), which uses pressure alone, or a combination of heat and pressure, to form a plurality of locations on inflatable article 100, to result in uninflated, inflatable article 10 as illustrated in FIG. 1. Of course, forming apparatus 84 should not heat the unbonded regions of inflatable article 100 to a temperature high enough that the unbonded regions fuse to one another.

As an alternative to the process illustrated in FIG. 7, described above, the film for the entire article may be formed by extruding a single flat film (i.e., instead of two films 12 and 14) from a slot die having at least twice the desired width of the inflatable article, this film being center folded and bonded to itself to form the inflatable article. As is readily apparent, depending upon the manner in which the centerfolded film is bonded together, the resulting inflatable article can utilize an open inflation skirt or a closed inflation manifold.

Alternatively, a tubular film can be extruded through a single annular die, in a process producing a film having a circumference equal to twice the desired width of the inflatable article. In one embodiment, this tubular film is placed in lay flat configuration without any longitudinal slitting, with the inside of the tubing being bonded to itself to result in an inflatable article having a closed inflation manifold. Alternatively, the tubular film can be slit lengthwise, centerfolded in lay-flat configuration, and bonded to itself to form the inflatable article. Again, depending upon the manner in which the bonding is performed, the resulting inflatable article can have either an open inflation skirt or a closed inflation manifold.

Figure 8:
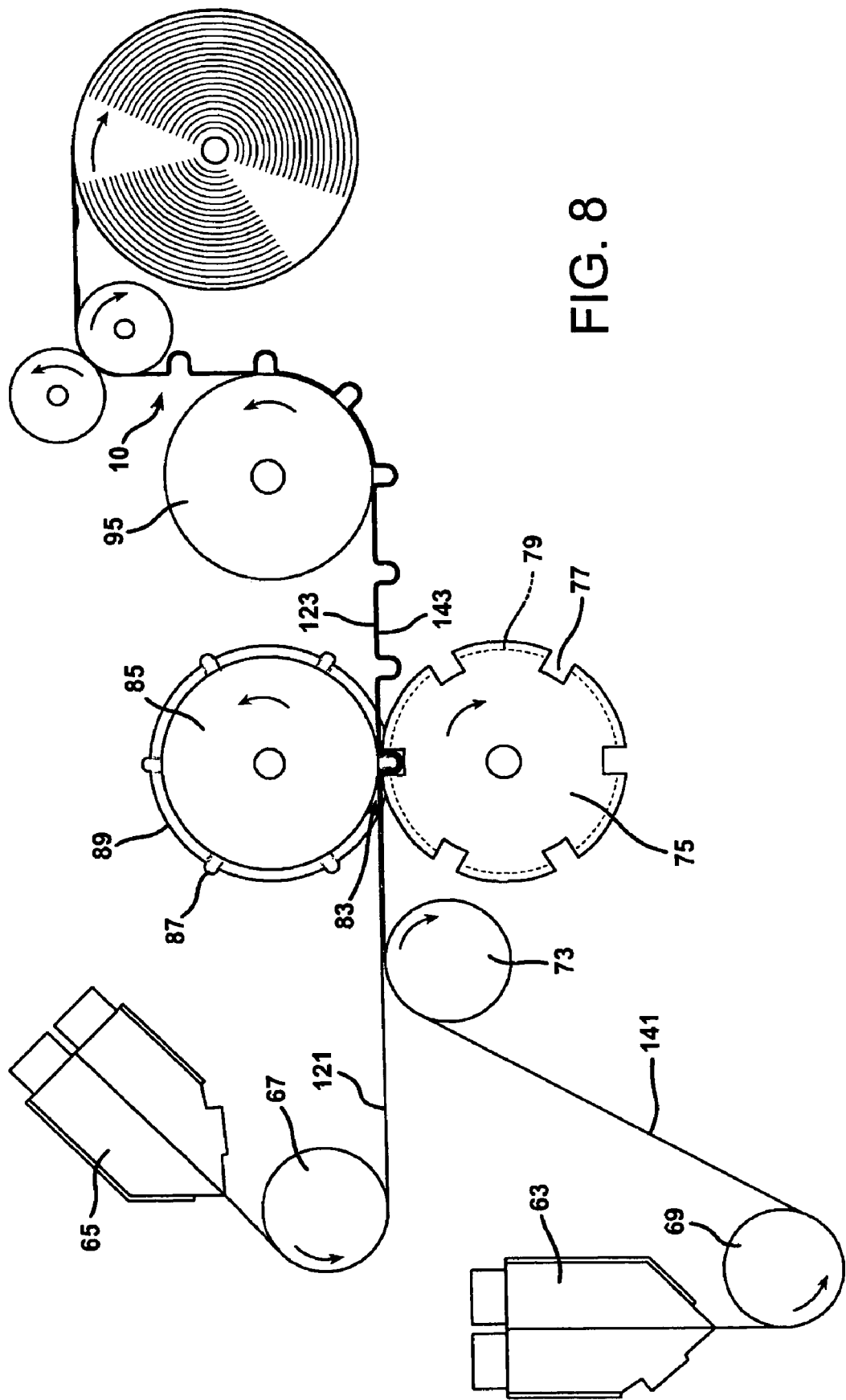
FIG. 8 is a schematic of an alternative process for making the inflatable article in accordance with the present invention.

FIG. 8 is a schematic of an alternative process for making an inflatable article in accordance with the present invention. FIG. 8 illustrates a process in which flat films 121 and 141 are extruded from respective extruders 63 and 65, each of which have a slot die therewith, following which films 121 and 141 each make a partial wrap around heat transfer (cooling) rollers 67 and 69, respectively. Flat films 121 and 141 are forwarded off of respective cooling rollers 67 and 69 and come together on merging and alignment roller 73, with merged films 121 and 141 passing through a nip between embossing roller 75 and forming roller 85.

Embossing roller 75 has a plurality of cavities 77 on the surface thereof corresponding with the location of each of the cells of the inflatable chambers, as well as elongate-shaped cavities (not illustrated) corresponding to connecting channels and inflation channels, and circumferential channel 79 (optional) corresponding with the location of the inflation manifold (optional). Forming roller 85 has a plurality of annular-shaped protuberances 87 corresponding with the location of each of the cells of the inflatable chambers, as well as an elongate-shaped protuberances (not illustrated) corresponding to the connecting channels and inflation channels, and circumferential protuberance 89 corresponding with the location of the optional inflation manifold. Embossing roller 75 and forming roller 85 work together to form films 121 and 141 as they pass through nip 83. Embossing roller 75 and forming roller 85 use pressure and/or vacuum, preferably in combination with heat, to form films 121 and 141.

Regions of film 121 are formed so that they nest within the cavities formed in film 141. If heat is used in the forming operation, the temperature to which films 121 and 142 are heated should be below the temperature at which films 121 and 141 fuse together under the applied pressure in the nip. The forming which occurs in nip 83 transforms flat films 121 and 141 so that they emerge from nip 83 as first formed film 123 and second formed film 143.

Of course, protuberances 87 and 89 on forming roller 85 are sized, positioned, and aligned to enter cavities 77 and 79 on embossing roller 75, in nip 83 between embossing roller 75 and forming roller 85. Protuberances 87 and 89 are undersized relative to cavities 77 and 79 on embossing roller 75. In the forming process, flat films 121 and 141 are formed, but not damaged, as they pass together through nip 83, at which protuberances 87 and 89 force regions of films 121 and 141 into cavities 77 and 79, with pressure alone or with a combination of heat and pressure. Heat can be supplied by heating at least the film-contact surface of embossing roller 75 and/or forming roller 85. In order to assist in the forming process, any heating which is used should heat the films to a temperature below which films 121 and 141 bond to one another, but above the glass transition temperature ("$T_g$") of one or more of the polymers in one or more of films 121 and 141. Apparatus for heating films 121 and 141 to an elevated temperature is not illustrated in FIG. 8.

After emerging from nip 83, the resulting formed films 123 and 143 make a partial wrap together around heat sealing roller 95. Formed films 121 and 141 contact heat sealing roller 95 so that only the unformed area (i.e., "land area") of formed film 121 is in direct contact with the hot surface of heat sealing roller 95. As illustrated in FIG. 8, the formed regions of formed films 123 and 143 are oriented away from heat sealing roller 95, so that the formed areas are not bonded to one another. The tension on formed films 123 and 143 presses the land areas of formed films 121 and 141 against each other, and together with the heat from heat sealing roller 95 for the period of the partial wrap around hot sealing roller 95, causes formed films 121 and 141 to be heat sealed to one another at the land area (i.e., the unformed area), while leaving the formed areas unsealed to one another, to result in an uninflated formed inflatable article, such as inflatable article 10 illustrated in FIG. 1.

As an additional (and optional) step in the process illustrated in FIG. 6, uninflated formed inflatable article 10 can be run through an additional nip to mash the formed region of the films flat. This assists in winding up uninflated formed inflatable article 11, in that the formed areas, once flattened, are less destabilizing to the roll than if the inflatable article 10 is wound up in its formed but unflattened state.

Although embossing roller 75 as illustrated has cavities 77 which extend inwardly from a smooth cylindrical surface, embossing roller 75 could be provided with multiple flat surfaces each extending across roller 75, with cavities 77 extending inwardly from a given flat surface. For example, roller could have a hexagonal cross-sectional shape with each of the six cavities 77 being positioned in the middle of a side of the hexagon. Likewise, forming roller 85 could have a hexagonal cross-sectional shape with each of the six protrusions 87 extending from the middle of a side of the hexagon. Providing such a "faceted" design to the embossing and forming devices could be used in the process of FIG. 8, as well as in the process of FIG. 7, i.e., substituting for forming apparatus 84. Each roller could be provide with from 3-100 facets, more preferably from 6 to 50 facets, more preferably from 12 to 50 facets, and more preferably from 20 to 50 facets.

A significant difference between the process of FIG. 7 and the process of FIG. 8 is that in the process of FIG. 7, the inflatable article is made by first heat sealing the films to one another, and thereafter forming the films. In contrast, in the process of FIG. 8, the films are first formed and thereafter heat sealed to one another.

Further details concerning methods making inflatable article 10 are disclosed below and are also disclosed in U.S. Pat. No. 6,800,162 B2. Still further details are disclosed in several additional copending U.S. patent applications, including (i) U.S. Ser. No. 10/302004, entitled "HIGH STRENGTH HIGH GAS BARRIER CELLULAR CUSHIONING ARTICLE", to Kannankeril et al., filed Nov. 22, 2002, published as 2004/0101658A1, (ii) U.S. Ser. No. 10/648113 entitled "HIGH STRENGTH HIGH GAS BARRIER CELLULAR CUSHIONING ARTICLE", to Kannankeril et al., filed Aug. 26, 2003, published as 2004/0101659A1, and (iii) U.S. Ser. No. 10/648,015, entitled "PROCESS FOR MAKING AND AGING HIGH STRENGTH HIGH GAS BARRIER CELLULAR CUSHIONING ARTICLE", to Kannankeril et al., filed Aug. 26, 2003, published as 2004/0099986A1. The entirety of each of these published applications is hereby incorporated by reference thereto.

The forming process utilized in FIG. 7 and FIG. 8 can be supplemented by providing vacuum within the embossing roller 75 or 76. Vacuum can be supplied as described in, for example, U.S. Pat. No. 2,776,451, to Chavannes, entitled "Apparatus and Method for Producing Embossed Thermoplastic Material", issued Jan. 8, 1957, which is hereby incorporated, in its entirety, by reference thereto. See also U.S. Pat. No. 3,285,793, also to Chavannes, entitled "Method of Manufacturing a Composite Cellular Material", issued 15 Nov. 1966, which is also hereby incorporated, in its entirety, by reference thereto. See also U.S. Pat. No. 3,346,438, also to Chavannes, entitled "Method and Apparatus for Making Cushioning and Insulating Material", issued Oct. 10, 1967, which is also hereby incorporated, in its entirety, by reference thereto.

A preferred multilayer film structure for the film or films to be bonded together to make the inflatable cushioning article a symmetrical A/B/C/B/A layer arrangement having a total thickness of 1.5 mils. The A layers together make up 86 percent of the total thickness (each layer having a thickness of 43%, as preferably the layer thickness is also symmetrical), each of the B layers making up 2% of the total thickness, and the C layer making up 10% of the total thickness. Each of the A layers are made from a blend of 45% by weight HCX002 linear low density polyethylene having a density of 0.941 g/cc and a melt index of 4, obtained from Mobil, 45% by weight LF10218 low density polyethylene having a density of 0.918 g/cc and a melt index of 2, obtained from Nova, and 10% by weight SLX9103 metallocene-catalyzed ethylene/alpha-olefin copolymer, obtained from Exxon. Each of the B layers are tie layers made of 100% Plexar® PX3236 anhydride modified linear low density polyethylene copolymer from Equistar Chemicals LP, of Houston, Tex. The C layer is an $O_2$-barrier layer of 100% Caplon® B100WP polyamide 6 having a viscosity of $F_{av}$=100, obtained from Allied Chemical.

Upon inflation, the cushioning article resists popping when pressure is applied to a localized area because connecting channels 28 allow air to move from one cell into another. The laminates show excellent creep resistance and cushioning properties due to inter-passage of air between cells.

Preferably, the film(s) are as thin as possible, in order to minimize the amount of resin used, but with the films being thick enough to provide adequate durability. Preferably, the film(s) have a total thickness of from about 0.1 to about 20 mils. More preferably, each film has a total thickness from about 0.5 to about 10 mils, more preferably from about 0.8 to about 4 mils, and even more preferably from about 1.0 to about 3 mils. Of course, the thickness may be somewhat reduced in the formed regions. The degree of thickness reduction depends upon the amount and manner in which the films are formed.

A dome-shaped formed region is a preferred shape for the film regions which are formed. The dome shape is preferred for the inflatable article illustrated in FIGS. 1-6, and in the inflatable article made in accordance with the processes illustrated in FIG. 7 and FIG. 8, each of which is described above. Preferred species of domed shapes include semi-sphere and oval section dome. Other preferred formed shapes include vertically-oriented cylinder with a flat top, vertically-oriented cylinder with a domed top, conic-shaped side walls with flat top or domed top, rectangular, cubic, horizontally-oriented cylinder section, and horizontally-oriented oval cross-section cylinder section, as well as wavy cylinder sections.

Of course, in the inflatable article made according to the process of FIG. 8, the films are also formed in the regions corresponding with the locations of the connecting channels, the inflation channels, and the open skirt or closed inflation manifold. A preferred shape for the film regions which correspond with the formed connecting channels and formed inflation manifold is a semi-cylinder shape in which the cylinder is halved in a plane including the central axis of the cylinder, with the cylinder being on its side, i.e., the axis of the cylinder being parallel to the lay-flat plane of the film. The open skirt can be formed in any manner which keeps the skirt away from the heat sealing roller during the heat sealing step as illustrated in FIG. 8. Of course, if the process used to make the inflatable article is a process as illustrated in FIG. 7, the film regions which correspond with the inflation manifold or open skirt need not be formed, as the locations of the raised surfaces of the raised surface roller (rather than the location of the unformed area) determine the locations which are heat sealed together.

If desired, various additives are also included with the films. For example, additives comprise pigments, colorants, fillers, antioxidants, flame retardants, anti-bacterial agents, anti-static agents, stabilizers, fragrances, odor masking agents, anti-blocking agents, slip agents, and the like. Thus, the present invention encompasses employing suitable film constituents.

Although the inflatable article is made by sealing two outer film layers to one another, if the film cross-section is symmetrical with respect to layer composition, as is preferred, both outer layers are herein referred to as "seal layers", even though only one of the layers is not heat sealed to the other film making up the inflatable article. If the seal layers make up the majority of the overall film weight, the seal layers are present for more purposes than just sealing. The seal layers can provide much of the strength, bulk, abuse, abrasion, and impact strength properties for the inflatable article. Preferably the cross section of the multilayer film is symmetrical with respect to layer arrangement, layer thickness, and layer composition.

Providing the film(s) with a gas barrier layer results in an inflated cushioning product having a longer life under load, as the gas barrier layer allows the inflated cushioning article to retain gas in the cells for a longer period of time while the cells are under load. This is important because without a gas barrier layer, the cushioning product under load can exhibit substantial loss of fluid, i.e., "creep", in, for example, four to seven days. Suitable resins for use in the gas barrier layer include hydrolyzed ethylene/vinyl acetate copolymer (designated by the abbreviations "EVOH" and "HEVA", and also referred to as "ethylene/vinyl alcohol copolymer", and "saponified ethylene/vinyl acetate copolymer"), polyvinylidene chloride (including vinylidene chloride/vinyl chloride copolymer "PVDC-VC", and vinylidene chloride/methyl acrylate copolymer "PVDC-MA"), polyacrylonitrile, polyester (including polyalkylene carbonate), polyamide, etc., as known to those of skill in the art. A particularly preferred gas barrier layer is made from 100% CAPLON® B100WP polyamide 6 having a viscosity of Fav=100, obtained from Allied Chemical.

If the film(s) are multilayer films having one or more seal layers and a barrier layer, it is likely that the polymer of the seal layer(s) does not bond strongly to the polymer of the barrier layer. The solution to this problem is to provide the film with a tie layer between each seal layer and the barrier layer. As used herein, the phrase "tie layer" refers to any internal layer having the primary purpose of adhering two layers to one another. A tie layer contains a polymer capable of covalent bonding to polar polymers such as polyamide and ethylene/vinyl alcohol copolymer, as well as being able to bond to, for example, polyolefins such a polyethylene and ethylene/alpha-olefin copolymers. A tie layer can serve to provide a strong bond to both the seal layer and the gas barrier layer. The tie layer can comprise any polymer having a polar group thereon (particularly a carbonyl group), or any other polymer which provides sufficient interlayer adhesion to adjacent layers which comprise polymers which do not adequately adhere to one another. Such polymers include olefin/unsaturated ester copolymer, olefin/unsaturated acid copolymer, and anhydride modified olefin polymers and copolymers, e.g., in which the anhydride is grafted onto the olefin polymer or copolymer. More particularly, polymers for use in tie layers include anhydride modified polyolefin, anhydride modified ethylene/alpha-olefin copolymer, ethylene/vinyl acetate copolymer, ethylene/butylacrylate copolymer, ethylene/methyl methacrylate copolymer, ethylene/acrylic acid copolymer, ethylene/methacrylic acid copolymer, and polyurethane. Modified polymers suitable for use as tie layers are described in U.S. Pat. No. 3,873,643, to Wu et al, entitled "Graft Copolymers of Polyolefins and Cyclic acid and acid anhydride monomers"; U.S. Pat. No. 4,087,587, to Shida, et al, entitled "Adhesive Blends"; and U.S. Pat. No. 4,394,485, to Adur, entitled "Four Component Adhesive Blends and Composite Structures", each of which are hereby incorporated, in their entirety, by reference thereto.

Preferred polymers for use in the tie layer include olefin polymers which are modified (e.g., grafted) with one or more monomers such as acrylic acid, methacrylic acid, fumaric acid, maleic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2. 1)hept-5-ene-2, 3-dicarboxylic acid anhydride, maleopimaric acid, tetrahydrophthalic anhydride, x-methylbicyclo(2.2.1)hept-5-ene-2,3-dicarboxylic acid anhydride, x-methylnorbom-5-ene-2,3-dicarboxylic acid anhydride, norborn-5-ene-2,3-dicarboxylic acid anhydride, Nadic anhydride, methyl Nadic anhydride, Himic anhydride, methyl Himic anhydride and other fused ring monomers, as known to those of skill in the art.

In the inflatable cellular cushioning article of the present invention, the tie layer can provides a high level of adhesive and cohesive strength in order to prevent the multilayer film from delaminating when the article is inflated to an internal pressure of 3 psi under standard conditions (i.e., 25° C. and 1 atmosphere pressure), and thereafter subjected to harsh conditions, for example, 140° F. for 4 hours. Not just any tie layer polymer is capable of providing a level of adhesive and cohesive strength adequate to provide the 3 psi inflated article with the desired performance properties when subjected to harsh conditions. More particularly, a tie layer made of 100 percent anhydride grafted low density polyethylene having an anhydride content of at least 160 parts per million based on resin weight (as measured by pyrolysis GC-MS), preferably about 190 parts per million, exhibits a level of adhesive and/or cohesive strength to prevent the article, when inflated to 3 psi, from delaminating under harsh conditions. Preferably, the modified polyolefin is selected from modified LLDPE, modified LDPE, modified VLDPE, and modified homogeneous ethylene/alpha-olefin copolymer.

Preferred polymers for use in the seal layer include homogeneous ethylene/alpha-olefin copolymer, heterogeneous ethylene/alpha-olefin copolymer (such as very low density polyethylene and linear low density polyethylene), ethylene homopolymer (low density polyethylene and high density polyethylene), ethylene unsaturated ester copolymer (e.g., ethylene vinyl acetate copolymer, ethylene butyl acrylate copolymer, etc), ionomer resin, and polyamide.

EXAMPLE

An inflatable article in accordance with the present invention was prepared in a manner similar to the process illustrated in FIG. 5, discussed above, with the exception that forming was not carried out in a fully integrated process as illustrated in FIG. 5. Rather, two flat films were extruded from two slot dies, respectively. Each film was a multilayer film having a thickness of 1.5 mils, each film having a symmetrical A/B/C/B/A layer arrangement, symmetrical layer composition, and symmetrical layer thicknesses. Each of the films had a unit weight of 38 grams per square meter. The layer arrangements, thicknesses, and compositions were as follows:

TABLE I

| Layer Identity | Thickness of Each Layer (% of Total Film Thickness) | Layer Composition |
|---|---|---|
| A Seal Layer | 43 | Blend of 45 wt % HCX002 linear low density polyethylene, 45 wt. % LF10218 low density polyethylene, and 10% by weight SLX9103 metallocene-catalyzed ethylene/alpha-olefin copolymer |
| B Tie layer | 2 | 100 wt. Percent Plexar ® PX3236 anhydride modified linear low density polyethylene copolymer |
| C Barrier Layer | 10 | 100% Caplon ® B100WP polyamide 6 |

The flat films were cooled and thereafter heat sealed together by being passed in partial wrap around a raised surface roller in the manner illustrated by FIG. 5. The raised surface roller heat sealed the two films together in a pattern providing 7 cells connected in series by 6 connecting channels (i.e., one connecting channel between each pair of adjacent cells) having a width of about 9/16 inch and a length of about 3/16 inch. Each of the cells had a diameter of about 1¾ inches. An inflation channel having a length of about ¾ inch and a width of about 9/16 inch connected the open skirt to the proximate cell. The open skirt was formed by flaps of film each having a width of ⅞ inch. Each cell was circular in shape and had a diameter of about 1.75 inches.

A 3¼-inch long piece of the resulting uninflated, unformed, inflatable article 100 was cut from the roll, the piece extending across the full 15½ inch width of the inflatable article. The 3¼-inch long piece of the inflatable article had one chamber running down the middle thereof.

Each of the 7 cell regions was individually heated, i.e., one at a time, for about 5 seconds with air at 240° F., using a from a Steinel HG 3002 LCD heat gun, obtained from Steinel America, Inc., 9051 Lyndale Avenue South, Bloomington, Minn. 55423.

Immediately after the heating of each of the cell regions, the resulting hot portion of the article was placed in the press portion of a Mullen Tester, obtained from B.R. Perkins & Son, Inc., of Holyoke, Mass. The press portion of the Mullen tester was used to press the hot portion of both of the films to form a dome-shaped region having a diameter of one inch and a height of approximately ⅜ inch. Both films were formed simultaneously without trapping air between the films, and without any fusion of the films in the formed areas. Each of the 7 cell regions of the films was formed in this manner.

After each of the cell regions were formed as described above, the resulting formed inflatable article 10 was inflated to an internal pressure of 3 psi, and a heat seal was made across the inflation channel to seal the chamber closed and entrap the air, under pressure, within the closed chamber. The inflated cells exhibited a total thickness of about 1 inch.

A measurement across the width of the formed, inflated article revealed that the width of the inflated article was about 13⅜ inches, i.e., a width reduction upon inflation of from 15½ inches to 13⅜ inches, which was a width reduction of only about 13.5 percent. A comparative sample of the unformed, uninflated inflatable chamber 10 was inflated to about 3 psi. The comparative inflated chamber was sealed closed at 3 psi, and when measured revealed a width reduction of from about 15½ inches to 10¾ inches, i.e., a width reduction upon inflation of about 31 percent.

Thus, in the inflatable article according to the invention, the reduction in width contraction upon inflation appeared to be due to the forming of the cell regions of the films. It is believed that if the forming is carried out throughout the entire cell region, and if both films are formed to a dome height of about ½ inch, the width reduction upon inflation to a pressure of about 3 psi will be very low, i.e., close to 0 percent. Moreover, the height of the inflated cells in the formed inflatable article 10 was about 25% higher than the height of the cells in the inflated comparative sample.

In the figures and specification, there have been disclosed preferred embodiments of the invention. All sub-ranges of all ranges disclosed are included in the invention and are hereby expressly disclosed. Those skilled in the art will appreciate that numerous changes and modifications may be made to the embodiments described herein, and that such changes and modifications may be made without departing from the spirit of the invention.

What is claimed is:

1. An inflatable article comprising a first film bonded to a second film so as to provide between the first film and the second film a plurality of inflatable chambers comprising a plurality of cells, with each of the cells in the chambers being connected to at least one adjacent cell by an inflatable connecting channel, the first film being bonded to the second film between adjacent inflatable chambers, the first film and the second film each having a plurality of formed regions, the formed regions corresponding with locations of the cells and locations of the connecting channels, with each of the formed regions of the second film being nested into each of the formed regions of the first film.

2. The inflatable article according to claim 1, wherein each of the formed regions of each of the cells is surrounded by an unformed, unbonded region of the film for enveloping a single inflatable cell.

3. The inflatable article according to claim 1, wherein the inflatable chambers extend transversely across the inflatable article.

4. The inflatable article according to claim 1, wherein the first film is bonded to the second film with a heat seal.

5. The inflatable article according to claim 1, wherein the first film has a unit weight of from 20 to 250 grams per square meter and the second film has a unit weight of from 20 to 250 grams per square meter.

6. The inflatable article according to claim 1, wherein the formed regions in the first film and the second film have a maximum dimension of from 0.25 to 3 inches.

7. The inflatable article according to claim 1, wherein the first film has a unit weight of from 60 to 250 grams per square meter and the second film has a unit weight of from 60 to 250 grams per square meter, and the formed regions in the first film and the second film have a maximum dimension of from 0.5 to 6 inches.

8. The inflatable article according to claim 1, wherein the formed regions in the first film have a height of from about 1 millimeter to about 50 millimeters, and the formed regions in the second film and the second film have a height of from about 1 millimeter to about 50 millimeters.

9. The inflatable article according to claim 1, wherein the first film has a thickness of from about 0.5 to about 6 mils and the second film has a thickness of from about 0.5 to about 6 mils.

10. The inflatable article according to claim 1, further comprising an open inflation skirt along a first edge running the length of the article.

11. The inflatable article according to claim 1, further comprising a closed inflation manifold running the length of the article.

12. The inflatable article according to claim 11, wherein the closed inflation manifold extends along a first edge of the inflatable article, with the plurality of inflatable chambers extending from the inflation manifold across the inflatable article.

13. The inflatable article according to claim 11, wherein a plurality of inflatable chambers extends from a first side of the inflation manifold and a plurality of inflatable chambers extends from a second side of the inflation manifold, with the inflatable chambers which extend from the first side of the inflation manifold extending across the inflatable article towards a first side edge of the inflatable article, and the inflatable chambers which extend from the second side of the inflation manifold extending across the inflatable article towards a second side edge of the inflatable article.

14. The inflatable article according to claim 1, wherein each of the inflatable chambers contains from 3 to 20 cells.

15. The inflatable cellular cushioning article according to claim 1, wherein the first and second films are connected to one another along one fold line.

16. The inflatable cellular cushioning article according to claim 1, wherein the first and second films are connected to one another along two fold lines.

17. The inflatable cellular cushioning article according to claim 1, wherein the first film and second film are separate films.

18. The inflatable cushioning article according to claim 1, wherein the bond is a heat seal.

19. The inflatable cellular cushioning article according to claim 1, wherein the first film is a multilayer film and the second film is a multilayer film.

20. The inflatable cellular cushioning article according to claim 19, wherein the first film comprises a seal layer and an $O_2$-barrier layer, and the second film comprises a seal layer and an $O_2$-barrier layer.

21. The inflatable cellular cushioning article according to claim 20, wherein:
   the first film comprises first and second outer layers, a central gas barrier layer, a first tie layer between the first outer layer and the gas barrier layer, and a second tie layer between the gas barrier layer and the second outer layer; and
   the second film comprises first and second outer layers, a central gas barrier layer, a first tie layer between the first outer layer and the gas barrier layer, and a second tie layer between the gas barrier layer and the second outer layer; and
   wherein the first outer layer of the first film is sealed to the first outer layer of the second film.

\* \* \* \* \*